United States Patent [19]

Tavian et al.

[11] Patent Number: 5,749,236
[45] Date of Patent: May 12, 1998

[54] AUTOMATIC AIR RECIRCULATION SYSTEM

[75] Inventors: Armando Tavian, Farmington Hills; Alexander Kargilis, Southfield, both of Mich.

[73] Assignee: Chrysler Corporation, Auburn Hills, Mich.

[21] Appl. No.: 789,359

[22] Filed: Jan. 27, 1997

[51] Int. Cl.$^6$ .......................... F25D 17/00; F25D 17/04; F25D 29/00

[52] U.S. Cl. .................. 62/186; 62/180; 62/161; 165/204

[58] Field of Search ..................... 62/180, 177, 186, 62/244, 239, 161, 323.1; 165/204

[56] References Cited

U.S. PATENT DOCUMENTS

| | | | |
|---|---|---|---|
| 3,315,730 | 4/1967 | Weaver et al. | 165/23 |
| 3,774,676 | 11/1973 | Franz | 165/204 |
| 3,983,930 | 10/1976 | Franz | 165/204 |
| 4,186,564 | 2/1980 | Myers | 62/180 |
| 4,320,628 | 3/1982 | Okajima | 62/186 |
| 4,320,797 | 3/1982 | Kagohata | 165/12 |
| 4,328,855 | 5/1982 | Iwata et al. | 165/2 |
| 4,337,818 | 7/1982 | Franz | 165/2 |
| 4,339,076 | 7/1982 | Sakakibara | 236/84 |
| 4,365,663 | 12/1982 | Inoue et al. | 62/180 |
| 4,391,320 | 7/1983 | Inoue et al. | 165/2 |
| 4,490,987 | 1/1985 | Peterson | 62/186 |
| 4,539,823 | 9/1985 | Nishi et al. | 62/228 |
| 4,616,484 | 10/1986 | Mehdi et al. | 62/180 |
| 4,709,751 | 12/1987 | Ichimaru et al. | 165/17 |
| 4,802,405 | 2/1989 | Ichitani et al. | 98/2.06 |
| 4,841,734 | 6/1989 | Torrence | 62/115 |
| 4,865,119 | 9/1989 | Okada et al. | 165/16 |
| 4,913,347 | 4/1990 | Burst et al. | 236/13 |
| 4,914,924 | 4/1990 | Takahashi | 62/133 |
| 4,944,160 | 7/1990 | Malone et al. | 62/180 |
| 4,974,776 | 12/1990 | Oshizawa | 236/13 |
| 4,996,849 | 3/1991 | Burst et al. | 62/133 |
| 5,284,025 | 2/1994 | Kajitani et al. | 62/160 |
| 5,590,540 | 1/1997 | Ikeda et al. | 62/180 |

*Primary Examiner*—William Doerrler
*Attorney, Agent, or Firm*—Roland A. Fuller, III

[57] ABSTRACT

An automatic air recirculation system is provided. The system activates an air recirculation door for recirculating the air within the vehicle passenger compartment by sensing the temperature of the engine coolant. The system also activates the air recirculation door by sensing the pressure or temperature in the compressor discharge line.

11 Claims, 2 Drawing Sheets

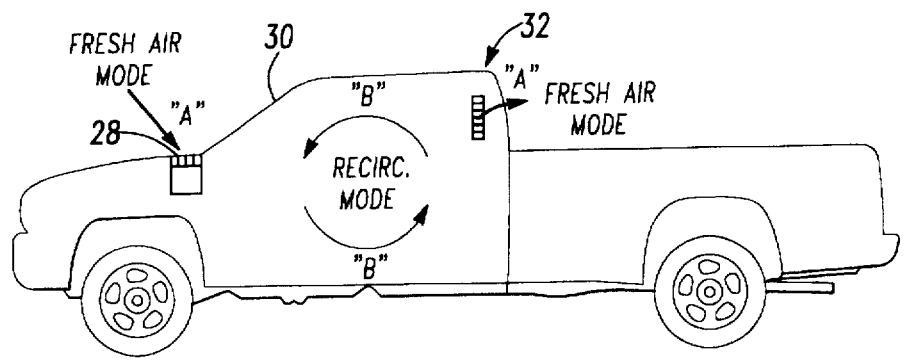
_Fig-1_
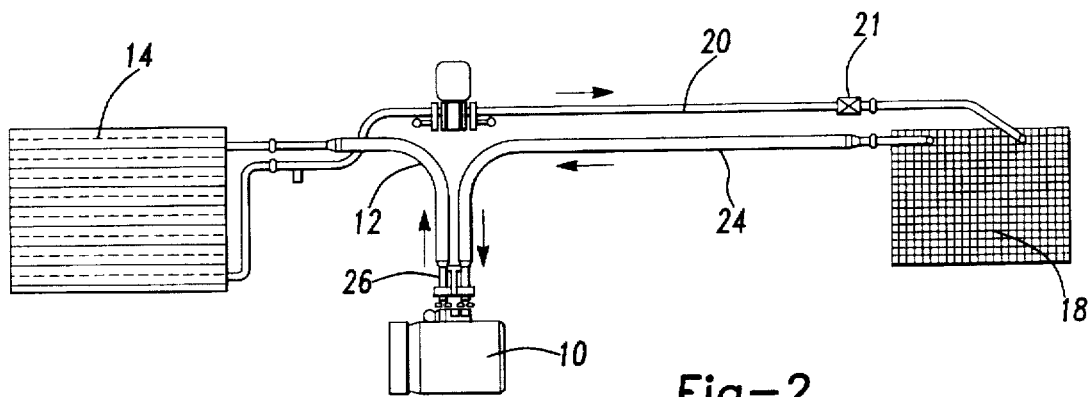
_Fig-2_
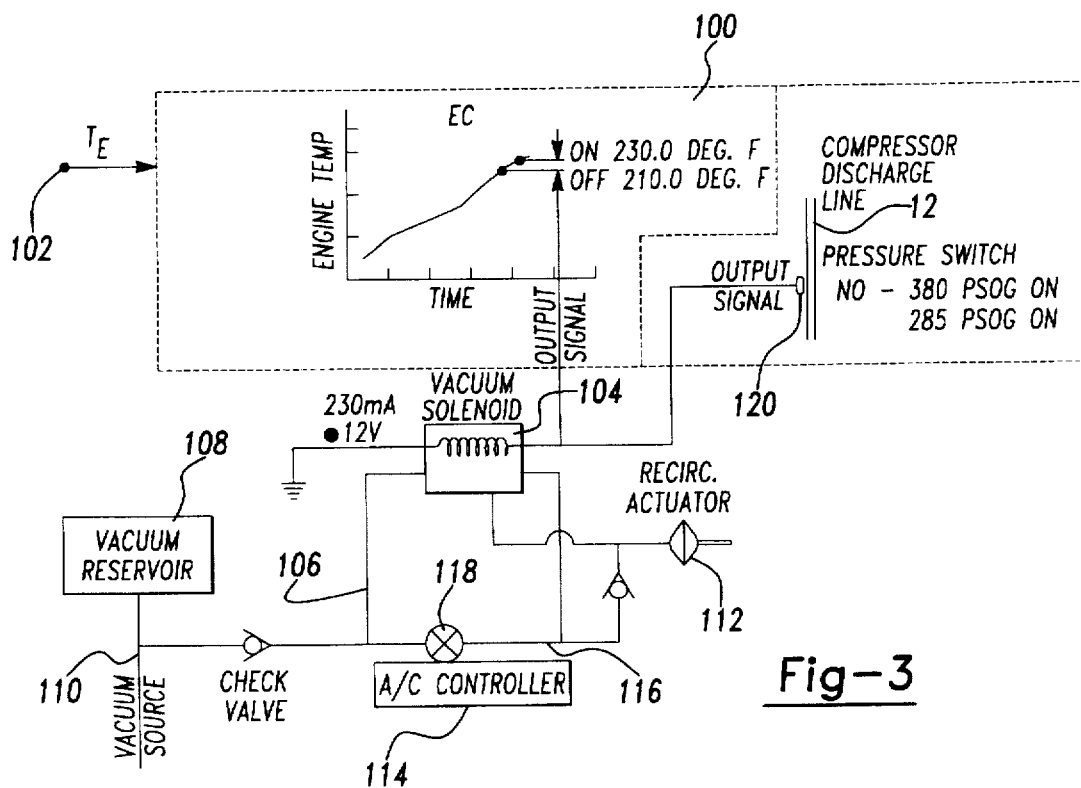
_Fig-3_

AUTOMATIC AIR RECIRCULATION SYSTEM

BACKGROUND OF THE INVENTION

FIELD OF THE INVENTION

The present invention relates to automotive air conditioning systems, and more particularly, to an automatic air recirculation system.

BACKGROUND AND SUMMARY OF THE INVENTION

Automobiles have been equipped with air conditioning systems for many years. As shown in FIG. 2, an air conditioning system typically includes a compressor 10 which is used to compress the low-pressure refrigerant vapor into a high pressure, high temperature vapor. The compressor 10 is provided with a discharge line 12 which is connected to a condenser 14 which is generally located in front of the engine radiator. The function of the condenser 14 is to cool the hot high pressure refrigerant gas received through the discharge line 12. The hot high pressure refrigerant gas is caused to condense into a high pressure, high temperature liquid refrigerant. The condenser 14 is connected to an evaporator coil 18 by a high pressure line 20. High pressure line 20 contains a flow device 21 which regulates the refrigerant flow depending on AC load. The refrigerant expands as it flows through the flow device, into a low pressure, low temperature liquid-gas stream. The evaporator coil 18 is located in the air conditioning housing 22, as shown in FIG. 5. The function of the evaporator coil 18 is to remove heat and dehumidify the air before it enters the vehicle. A suction line 24, which contains the low pressure low temperature gas, is provided for connecting the evaporator coil 18 to the compressor 10. A high-pressure cut-out switch 26 is provided in the discharge line 12. The switch is wired in series with the compressor clutch. The switch interrupts power to the compressor clutch, when excessive pressure is present.

With reference to FIG. 5, the system air flow of a conventional air conditioning system will be described. The system pulls outside air through a cowl opening 28 at the base of a windshield 30 of a vehicle 32. The air then goes through an outside air passage 34. The air is drawn in by a blower/motor 36 and passes through the evaporator 18. Air flow can be directed either through or around the heater core 38 by adjusting the blend door 40 with the temperature control on the vehicle instrument panel. The air flow can then be directed from the panel by first passage 42 by closing off the door 44 to the floor duct 46 and the door 48 to the defroster duct 50. Air flow can be directed through the panel duct 42 and the floor duct 46 by partially opening door 44 to an intermediate position. By closing door 44, air flow can be directed solely through the floor duct 46. Furthermore, by maintaining the door 44 at the intermediate open position, and closing door 48 of panel duct 42, the air flow can be provided through floor duct 46 and defroster duct 50. Finally, by closing off door 44 of floor duct 46, and also closing door 48 to panel duct 42, air flow can be directed solely through defroster conduit 50. Air flow velocity can be adjusted with the blower speed selector switch on an instrument panel of the vehicle.

Outside air can be shut off by fully opening recirculation door 52. This will open up the recirculation air passage 54 so that the air that is already inside of the vehicle will be recirculated through the air conditioning system. Typically, this is done by manually rotating a control knob into a recirculation position.

In the design of an automobile, the spatial constraints which are dictated by the vehicle body design leads to vehicle designers allocating certain amounts of space for each of the vehicle systems such as the engine cooling and air conditioning systems. These spatial constraints will limit the size of the condenser of the air conditioning system or the radiator of the engine cooling system.

The radiator is located behind the condenser. Ambient air flows through the condenser and is warmed by the condensing refrigerant. The warmed air then enters the radiator. The corresponding increase in radiator temperature from the warmed air passing through the condenser of the air conditioning system places an increased demand on the engine cooling system. Thus, the demands on the radiator due to pulling a heavy load or idling of the vehicle in combination with the cooling demands of the condenser of the air conditioning system may pose too much of a demand on the engine cooling system. Therefore, it is often desirable to reduce the demand on the engine cooling system by reducing the demands of the air conditioning system. The demands of the air conditioning system can be reduced by recirculating the cool air (approximately 70°) from within the vehicle passenger compartment. The corresponding reduction in temperature of the air passing through the evaporator 18 reduces the demands of the air conditioning system thereby decreasing the demands on the engine cooling system. When the head pressure in the condenser drops due to a decreased demand on the condenser, the load on the compressor also drops. Thus, there is a reduction in the pressure and temperature in the discharge line 12 of the air conditioning system.

Accordingly, the present invention provides an automatic air recirculation system for a vehicle which activates the air recirculation door for recirculating the air within the vehicle passenger compartment by sensing the temperature of the engine coolant. As an additional method the system of the present invention activates the air recirculation door by sensing the pressure and/or temperature of the compressor discharge line. When either the engine coolant temperature or the pressure or temperature in the compressor discharge line exceed predetermined values, the recirculation door is opened automatically. The opening of the recirculation door reduces the demands on the air conditioning system which thereby also reduces the demands on the engine cooling system.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is a schematic view illustrating the concepts of fresh air circulation and recirculation in a vehicle air conditioning system;

FIG. 2 is an illustration of the components of a typical air conditioning system;

FIG. 3 is a diagram of an automatic air recirculation system which is vacuum operated according to the principles of the present invention;

DETAILED DESCRIPTION OF THE PREFERRED EMBODIMENTS

Figure 4:
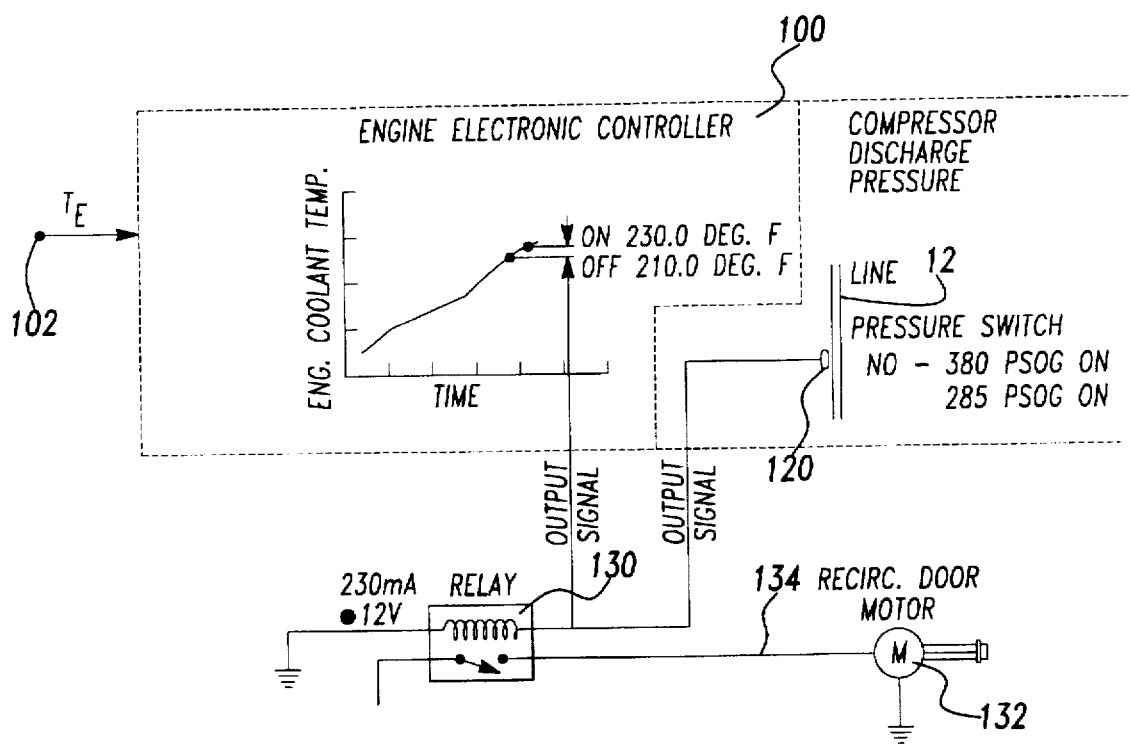
FIG. 4 is a diagram of an automatic air recirculation system which is electro-mechanically operated.
Figure 5:
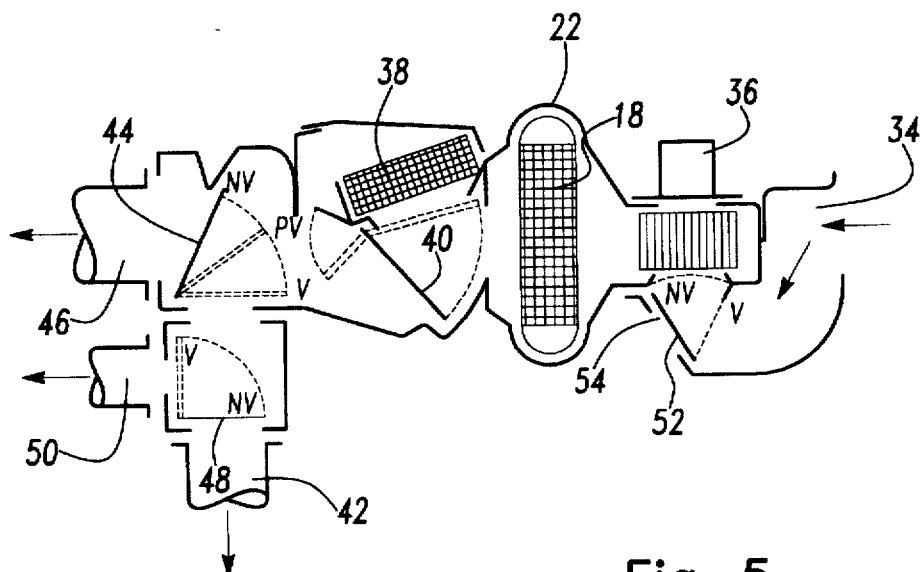
FIG. 5 illustrates an exemplary air flow system for a vehicle air conditioning system having an air recirculation function.

With reference to FIGS. 3 and 4, the preferred embodiments of the present invention will be described. FIG. 3 illustrates a vacuum controlled automatic air recirculation system, while FIG. 4 illustrates an electro-mechanically actuated automatic air recirculation system. With reference to FIG. 3, the vacuum controlled automatic air recirculation system includes an engine electronic controller 100. Controller 100 receives a signal representative of the engine coolant temperature from an engine coolant temperature sensor 102. The engine electronic controller 100 provides an "On" output signal when the engine temperature reaches a predetermined temperature such as, for example, 230° F. The engine controller 100 also provides an "Off" output signal when the engine coolant temperature falls below a second predetermined temperature such as, for example, 210° F. The output signals generated by the engine electronic controller 100 are supplied to a vacuum solenoid 104 which is disposed in vacuum line 106. Vacuum line 106 is connected to vacuum reservoir 108 and vacuum source 110. Vacuum solenoid 104 provides a connection in line 106 for delivering vacuum pressure to the recirculating actuator 112. It should also be noted that the air conditioning controller 114 disposed in line 116 is also provided with a valve 118 for connecting line 116 with recirculation actuator 112.

A pressure switch 120 is also provided in the compressor discharge line 12 of the air conditioning system. Pressure switch 120 provides an "On" output signal to the vacuum solenoid 104 when the pressure in the compressor discharge line 12 exceeds a predetermined pressure, such as, for example 380 PSIG. Pressure switch 120 also provides an "Off" output signal when the pressure falls below a second predetermined pressure, such as, for example 285 PSIG. It should be noted that the first and second predetermined pressures will vary depending on design alternatives. Furthermore, the temperature in the compressor discharge line could also be used for determining when to actuate the recirculation door. In which case, pressure switch 120 would be replaced with a temperature switch (not shown).

With reference to FIG. 4, the automatic air recirculation system of the present invention is shown with an electro-mechanical actuator for opening the recirculation door. The engine electronic controller 100 and pressure switch 120 provide "On" "Off" output signals in response to predetermined temperatures and pressures, respectively as discussed above with reference to FIG. 3. However, the output signals are delivered to a relay switch 130 which when connected delivers a current to the recirculation door motor 132 via electrical line 134. The recirculation door motor 132 is thereby actuated to open or close the recirculation door 52. It should be understood that other known actuating devices could be utilized for opening and closing the recirculation door 52 without departing from the spirit and scope of the present invention.

The described invention will automatically open the recirculation door of the air conditioning system when the engine coolant temperature or the compressor head pressure reach predetermined levels. The opening of the recirculation door will reduce the demand on the air conditioning system including reducing the head pressure in the compressor and condenser of the air conditioning system. The lower head pressure in the compressor reduces the stresses on the internal components of the compressor and improves the compressor volumetric efficiency by reducing compression ratio. Furthermore, the pressure on the refrigerant lines, couplings and connectors are also reduced. A reduction in the compressor head pressure also reduces the fuel consumption and exhaust emissions. The compressor brake horsepower can be decreased by about two BHP. This reduction contributes to emission reduction and fuel economy.

The described invention also improves the vehicle occupant's comfort because lower internal air temperatures can be achieved quicker since cooler internal air is recirculated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic air recirculation system for a vehicle air conditioning system, comprising:

an air cooling system including a compressor, a condenser, and an evaporator;

an outside air passage for allowing air to pass from outside said vehicle through said evaporator; a recirculation air passage for allowing air from inside said vehicle to pass through said evaporator;

a recirculation door movable between a first position for closing off said recirculation air passage to a second position for opening said recirculation air passage; and a controller for opening and closing said recirculation door, said controller including an engine temperature sensor, wherein said controller opens said recirculation door when a temperature detected by said engine temperature sensor exceeds a predetermined temperature.

2. The air recirculation system according to claim 1, wherein said controller further includes a pressure sensor in a discharge line of said compressor, wherein said controller opens said recirculation door when a pressure of said discharge line reaches a predetermined pressure.

3. The air recirculation system according to claim 1, wherein said controller further includes a temperature sensor in a discharge line of said compressor, wherein said controller opens said recirculation door when a temperature of said discharge line reaches a predetermined temperature.

4. The air recirculation system according to claim 1, wherein said controller includes a vacuum operated actuator for opening said recirculation door.

5. The air recirculation system according to claim 1, wherein said controller includes an electrically operated motor for opening said recirculation door.

6. An automatic air recirculation system for a vehicle air conditioning system, comprising:

an air cooling system including a compressor, a condenser, and an evaporator;

an outside air passage for allowing air to pass from outside said vehicle through said evaporator;

a recirculation air passage for allowing air from inside said vehicle to pass through said evaporator;

a recirculation door movable between a first position for closing off said recirculation air passage to a second position for opening said recirculation air passage; and a controller for opening and closing said recirculation door, said controller including a pressure sensor in a discharge line of said compressor, wherein said controller opens said recirculation door when a pressure of said discharge line reaches a predetermined pressure.

7. The air recirculation system according to claim 6, wherein said controller includes a vacuum operated actuator for opening said recirculation door.

8. The air recirculation system according to claim 6, wherein said controller includes an electrically operated motor for opening said recirculation door.

9. An automatic air recirculation system for a vehicle air conditioning system, comprising: an air cooling system including a compressor, a condenser, and an evaporator;

an outside air passage for allowing air to pass from outside said vehicle through said evaporator;

a recirculation air passage for allowing air from inside said vehicle to pass through said evaporator;

a recirculation door movable between a first position for closing off said recirculation air passage to a second position for opening said recirculation air passage; and a controller for opening and closing said recirculation door, said controller including a temperature sensor in a discharge line of said compressor, wherein said controller opens said recirculation door when a temperature of said discharge line reaches a predetermined temperature.

10. The air recirculation system according to claim 9, wherein said controller includes a vacuum operated actuator for opening said recirculation door.

11. The air recirculation system according to claim 9, wherein said controller includes an electrically operated motor for opening said recirculation door.

\* \* \* \* \*